May 12, 1931.  V. J. DAVIS  1,804,400

METHOD OF MOLDING

Original Filed Aug. 19, 1927   2 Sheets-Sheet 1

Inventor
Vernon J. Davis

By Popp and Powers.

Attorney

May 12, 1931. V. J. DAVIS 1,804,400
METHOD OF MOLDING
Original Filed Aug. 19, 1927 2 Sheets-Sheet 2
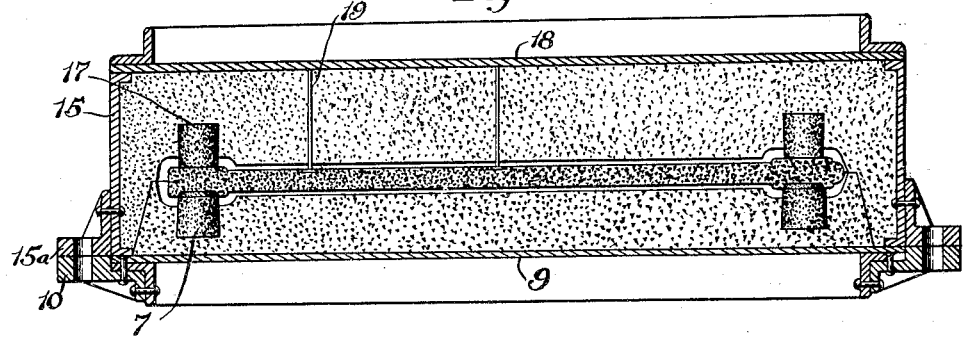
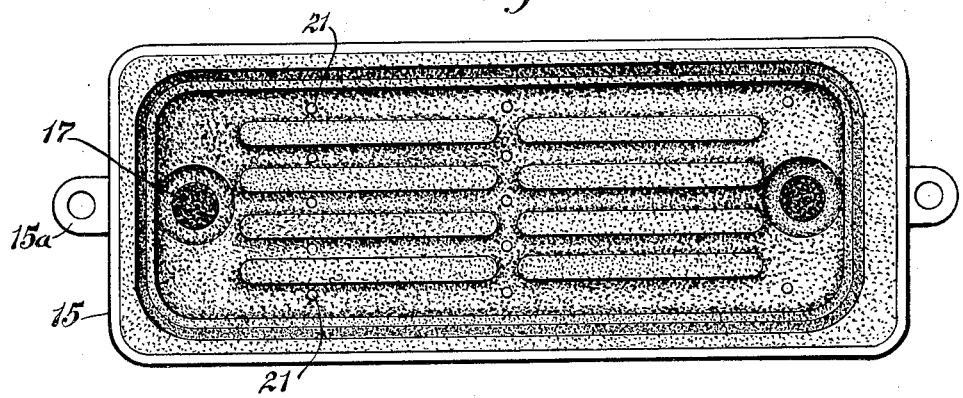
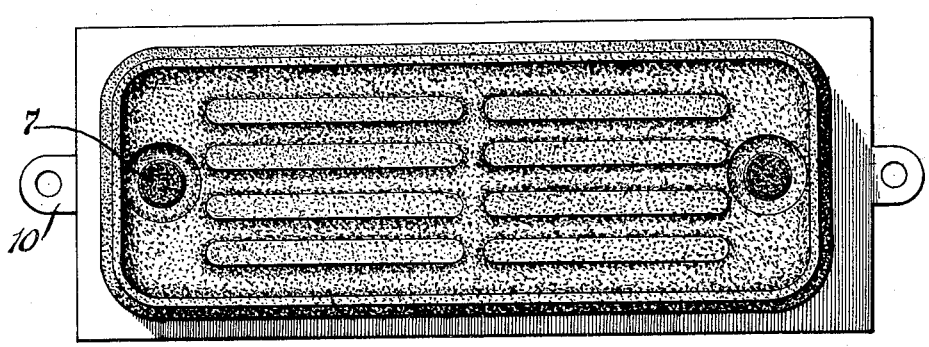
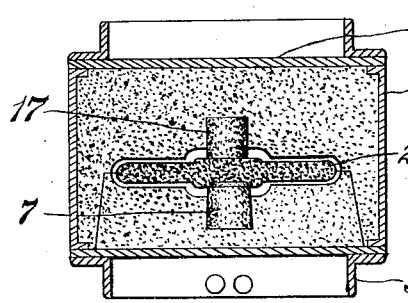
Inventor
Vernon J. Davis
By Popp and Powers
Attorney Patented May 12, 1931

1,804,400

UNITED STATES PATENT OFFICE

VERNON J. DAVIS, OF BUFFALO, NEW YORK

METHOD OF MOLDING

Application filed August 19, 1927, Serial No. 214,057. Renewed May 17, 1930.

This invention relates to the art of forming molds and involves improvements both in the method of preparing the mold sections and in the resultant mold structure. The molds to which the features of the invention are directed are of the kind which are used in the casting of hollow bodies in which operation baked cores are required and in a specific aspect the invention relates to the preparation and form of mold structure for use in the production of standard radiator castings.

The objects of the invention are to simplify the procedure of making the mold sections, to reduce the cost of such procedure, to avoid limitations imposed by the method heretofore employed to manual operations and enable machine operations to be substituted and to produce a superior mold in which the core will be accurately centered and securely held with the result of eliminating core displacement and the consequent loss.

These objects will be more readily understood if, as a preliminary, the known procedure of preparing molds of the character stated, be briefly summarized and its objectionable features pointed out. Such procedure involves, generally, the separate preparation of the drag and cope sections of the mold and the positioning of the core between such sections. In preparing the drag section, the drag pattern is initially studded with chaplets after which it is properly positioned and attached to the drag flask. The flask is then filled with sand which must be first packed, by hand, around each chaplet head and then thoroughly rammed around the pattern. After the flask is completely filled with packed sand and the open sand face leveled, a plate is placed over such face and functions as a support when the drag section is inverted; the latter operation being done in order to remove the pattern and thus expose the formed face of the completed drag section with the chaplets in place. The cope section of the mold is formed in the same manner and when it is completed, the sections are ready to receive the core. The core, for this type of molding, is integrally formed with oppositely extending core-like nipples at each end which in addition to their core function fit into corresponding recesses in the mold sections and thereby position the core and it is further provided with tin discs spaced along its surface which, when in position, provide bearing surfaces for the projecting ends of the chaplets and thus prevent the latter from piercing the core during the pouring operation. Thus in positioning the core it is set in the drag whereupon the cope is placed over the drag and the two sections clamped together.

The foregoing method is objectionable as involving a great loss of time due to the manual operations required. With the present type of chaplet, it is practically impossible to effect machine setting of the chaplets or to use a jolting or squeezing machine in forming the mold because such machines cannot pack the sand under the chaplet heads. The above method is also objectionable due to the fact that the core-like end nipples are often broken and in such cases, necessitate scrapping the complete core. Furthermore it is very difficult to get a tight fit between the end nipples and mold recesses and as a result accurate work is prevented, greater care in handling the mold is required and the use of drag chaplets to assist in centering the core is necessary.

The objects of the present invention are attained and the above objections overcome by means of a novel method of preparing the mold which involves the provision of individual end cores and a new form and arrangement of chaplet. These new features permit the positioning of the end cores during the mold forming operation whereby a jolting or squeezing machine may be used in such operation with the result that the end cores are accurately placed and so securely held as to dispense with the use of drag chaplets and to eliminate the possibility of core displacement. Furthermore the use of the new form of chaplet eliminates the pattern studding operation and the need of tin discs on the core and permits machine setting of such chaplets directly into the completed cope section of the mold.

For a better understanding of my invention tion, reference will be made to the accompanying drawings, in which:—

Fig. 5 is a vertical longitudinal central section of the complete mold.

Fig. 6 is a plan view of the formed cope face with chaplets in position.

Fig. 7 is a similar view of the drag.

Fig. 8 is a sectional view along the line 9—9, Fig. 5.

Figure 1:
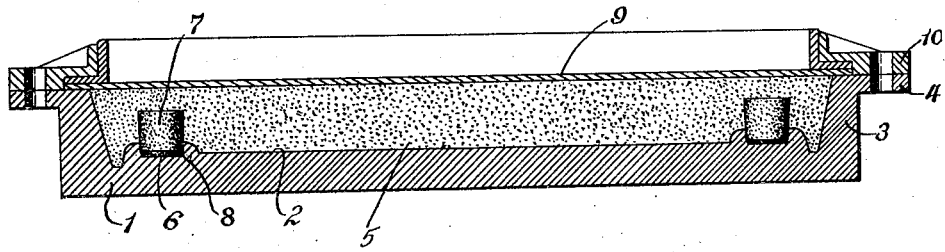
Fig. 1 is a vertical longitudinal central section of the formed drag section with the pattern in position.
Figure 2:
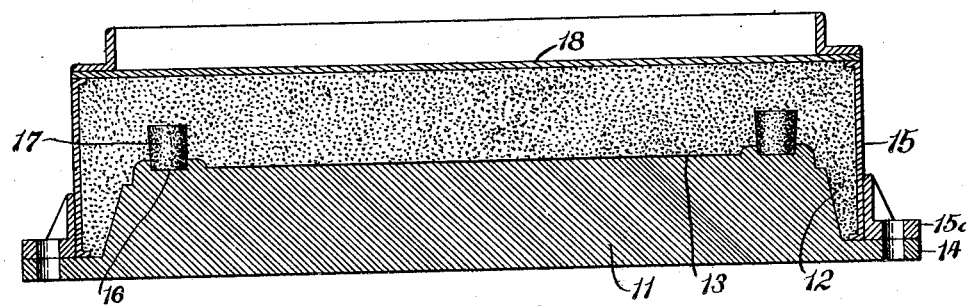
Fig. 2 is a similar view of the cope section.
Figures 3, 4:
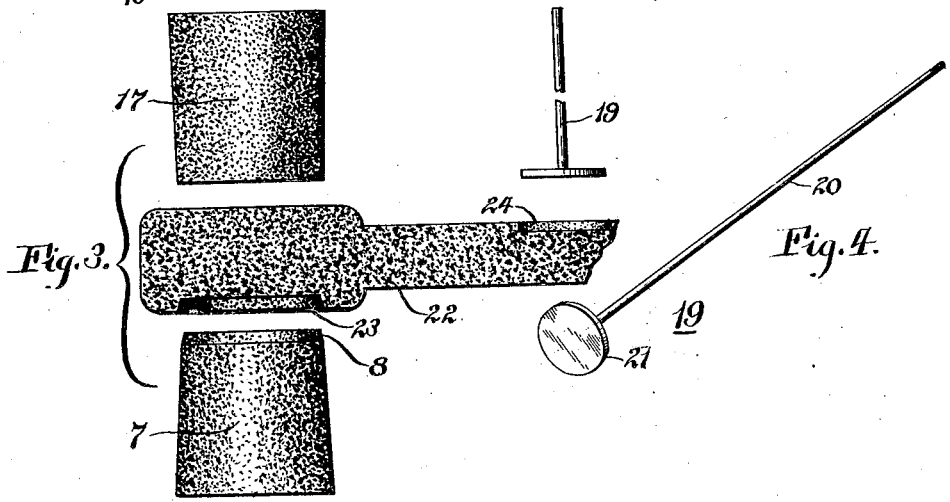
Fig. 3 is an enlarged vertical longitudinal central section showing in agroupment details of the structure and relative positions of the end cores and a chaplet with respect to the body core.
Fig. 4 is a perspective view of a chaplet.

The present method consists generally in forming the separate mold sections with end cores in place, setting the cope chaplets and finally positioning the body core. In connection with forming the drag sections, I preferably make use of a pattern as indicated at 1, having a suitable forming face 2 and upwardly extending sides 3 which are provided with positioning lugs 4. The inner faces of the sides 3 are inclined to form the walls of a chamber 5 for receiving the molding sand. The forming face 2 of the pattern is recessed at each end, as indicated at 6, to receive and position the drag end cores 7. The drag end cores 7 are preferably flared whereby they may be more securely held in the sand and the smaller ends of the cores are chamfered as at 8 to provide a seat for the body core. In forming the drag, the cores 7 are placed with their chamfered ends in the pattern recesses 6, and the chamber 5 filled with sand which is packed by means of a jolting or squeezing machine. After the sand is firmly packed, the open sand face is leveled and covered by the plate 9 which is properly positioned by alining the lugs 10 of plate 9 with the pattern lugs 4. The drag is now inverted and the pattern removed, the end cores of course remaining in the sand.

The use of the above pattern for the drag necessitates the use of a cope pattern as indicated at 11 having a raised body portion 12 provided with a forming face 13 and lugs 14 which co-operate with lugs 15—a on flask 15 properly to position the parts. The forming face 13 is provided with recesses 16 for the reception of cope end cores 17, these cores being flared in the same manner as the drag end cores but without chamfering. The cope is formed in the same manner as the drag, that is to say the end cores are placed in the pattern recesses and the flask filled with sand and packed whereupon it is covered with the usual plate 18 and inverted in order to remove the pattern.

The above procedure completes the mold forming operation and the next step is to set the chaplets 19. These are novel in that they are of nail form, having a stem 20 and a head 21. While this operation may be accomplished by hand I prefer to use a box nailing machine of any suitable type whereby the chaplets are quickly and accurately set. It is noted that these chaplets are to be accurately made of such length that the stem 20 abuts against the plate 18 when the head 21 is in its proper position. By this novel feature of arrangement the displacement of the chaplets and consequently the upward movement of the body core is positively prevented during the casting operation.

The final operation in the preparation of the mold is the positioning of the body core 22. This core is formed with recesses 23 at each end for the accommodation of the drag end cores, said recesses being shaped to fit over the end cores and rest on the seat provided by the chamfered end 8 thereof. The core 22 is also provided with recesses 24 to receive the chaplet heads 21, it being noted that the chaplet heads provide a large bearing surface for the chaplet against the core and thus dispense with the necessity of the tin discs previously used for such purpose. With the molds prepared as before described the body core 22 is accurately positioned by merely fitting the recesses 23 over the drag end cores whereupon the cope is inverted, placed over the drag and guided into position by alining the lugs 10 of the drag plate 9 with the lugs 15—a on the cope flask 15. By so doing the cope end cores will abut flush against the body core, thus co-operating with the drag end cores to prevent any displacement whatsoever of the body core, and the chaplet heads will set into their respective recesses in the body core. The mold may now be clamped and poured in the usual manner.

While I have herein specified a particular type of pattern which I prefer inasmuch as it dispenses with the drag flask, it is to be understood that I do not limit myself to this type but on the contrary may use any suitable type of pattern which may require a drag flask or even a several sectioned mold.

I claim as my invention:—

1. The method of preparing a mold for the casting of hollow bodies in which patterns are used for the formation of the mold sections and which consists in suitably positioning structurally independent baked end cores composed of core sand upon said patterns, forming the cope and drag sections of the mold by packing the mold sand upon the respective patterns and about the end cores whereby when the mold sections are removed from the patterns they will carry said end cores in projecting relation to the mold surfaces, removing the mold sections from the patterns, placing a baked body core composed of core sand upon the end cores of the drag section, and fitting the cope section upon the drag section with the end cores of the cope section engaging the body core.

2. The method of preparing a mold for the casting of hollow bodies in which patterns are used for the formation of the mold sections which consists in suitably positioning structurally independent baked end cores composed of core sand upon said patterns, forming the cope and drag sections of the mold by packing the mold sand upon the respective patterns and about the end cores whereby when the mold sections are removed from the patterns they will carry said end cores in projecting relation to the mold surfaces, removing the mold sections from the patterns, placing headed chaplets in the cope section with their heads located beyond the mold surface and the ends of their shanks engaging parts of the cope flask, placing a baked body core composed of core sand upon the end cores of the drag section, and fitting the cope section upon the drag section with the end cores and chaplets of the cope section engaging the body core.

3. The method of preparing a section of a mold to be used for the casting of hollow bodies in which a pattern is used for the formation of the mold section and which consists in suitably positioning structurally independent baked end cores composed of core sand upon said pattern, packing the mold sand upon the said pattern and about the end cores to form the mold section and secure the end cores thereto in projecting relation to the mold face whereby when the mold section is removed from the pattern it will carry said end cores, and remove the mold section from the pattern.

4. The method of preparing the cope of a mold to be used for the casting of hollow bodies consisting in forming the cope on a support and then setting headed chaplets at various points as desired along the formed face of the cope, the heads of said chaplets being located beyond the mold surface and shanks of said chaplets penetrating the cope sand and at their ends engaging said support whereby during the molding operation the support maintains the alinement of the chaplets.

5. The drag section of a mold to be used for the casting of hollow bodies comprising the drag composed of molding sand and structurally independent baked end cores of core sand embedded and anchored in the drag and having chamfered ends located beyond the mold surface and providing supporting seats for a body core.

6. Molding equipment for the casting of hollow bodies consisting of mold sections composed of molding sand, structurally independent baked end cores of core sand embedded and anchored in each of said sections, and a baked body core of core sand supported by and between and in removable relation to the end cores of the respective sections.

7. Molding equipment for the casting of hollow bodies consisting of mold sections composed of molding sand, structurally independent baked end cores of core sand embedded and anchored in each of said sections, and a baked body core of core sand supported by and between and in removable relation to the end cores of the respective section, said body core having at its lower side recesses to fit over the end cores of the lower section.

8. Molding equipment for the casting of hollow bodies consisting of mold sections composed of molding sand, structurally independent baked end cores of core sand embedded and anchored in each of said sections, headed chaplets carried by the upper section with their heads located beyond the mold surface and their shanks penetrating the molding sand with their ends engaging the sand support, and a baked body core of core sand supported by and between and in removable relation to the end cores of the respective sections and at its upper side engaging the heads of said chaplets.

9. Molding equipment for the casting of hollow bodies consisting of mold sections composed of molding sand, structurally independent baked end cores of core sand embedded and anchored in each of said sections, headed chaplets carried by the upper section and having their heads projecting beyond the mold surface, and a baked body core of core sand supported by and between and in removable relation to the end cores of the respective sections and having in its upper face recesses to fit over the heads of said chaplets.

10. Molding equipment for the casting of hollow bodies consisting of mold sections composed of molding sand, structurally independent baked end cores of core sand embedded and anchored in each of said sections, headed chaplets carried by the upper section and having their heads projecting beyond the mold surface and a baked body core of core sand supported by and between and in removable relation to the end cores of the respective sections and having in its upper face recesses to fit over the heads of said chaplets and in its lower face recesses to fit over the end cores of the lower section.

11. Molding equipment for the casting of hollow bodies consisting of mold sections composed of molding sand, structurally independent baked end cores of core sand embedded and anchored in each of said sections, headed chaplets carried by the upper section and having their heads projecting beyond the mold surface, and a baked body core of core sand supported by and between and in removable relation to the end cores of the respective sections and having in its upper face recesses to fit over the heads of said chaplets and in its lower face recesses to fit over the end cores of the lower section, the shanks of the chaplets penetrating the mold sand and with their ends engaging the sand support.

In testimony whereof I affix my signature.

VERNON J. DAVIS.